(12) United States Patent
Kotra et al.

(10) Patent No.: US 11,064,197 B2
(45) Date of Patent: Jul. 13, 2021

(54) DECODER SIDE INTRA MODE DERIVATION TOOL LINE MEMORY HARMONIZATION WITH DEBLOCKING FILTER

(71) Applicant: Huawei Technologies Co., Ltd., Shenzhen (CN)

(72) Inventors: Anand Meher Kotra, Munich (DE); Shan Liu, Shenzhen (CN); Zhijie Zhao, Munich (DE); Semih Esenlik, Munich (DE); Han Gao, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/735,285

(22) Filed: Jan. 6, 2020

(65) Prior Publication Data

US 2020/0145659 A1 May 7, 2020

Related U.S. Application Data

(63) Continuation of application No. PCT/EP2017/066695, filed on Jul. 4, 2017.

(51) Int. Cl.
*H04N 19/117* (2014.01)
*H04N 19/105* (2014.01)
*H04N 19/159* (2014.01)
*H04N 19/176* (2014.01)
*H04N 19/182* (2014.01)
*H04N 19/96* (2014.01)

(52) U.S. Cl.
CPC ......... *H04N 19/117* (2014.11); *H04N 19/105* (2014.11); *H04N 19/159* (2014.11); *H04N 19/176* (2014.11); *H04N 19/182* (2014.11); *H04N 19/96* (2014.11)

(58) Field of Classification Search
None
See application file for complete search history.

(56) References Cited

U.S. PATENT DOCUMENTS

| 2012/0106640 | A1 | 5/2012 | Shen et al. | |
|---|---|---|---|---|
| 2013/0058401 | A1* | 3/2013 | Song | H04N 19/176 375/240.03 |
| 2014/0211848 | A1* | 7/2014 | Hsu | H04N 19/14 375/240.02 |
| 2016/0301942 | A1 | 10/2016 | Qiu | |
| 2018/0255295 | A1* | 9/2018 | Lee | H04N 19/117 |

(Continued)

OTHER PUBLICATIONS

Xiu et al., "EE8: Decoder-side intra mode derivation," Joint Video Exploration Team (JVET) of ITU-T SG16 WP3 and ISO/IEC JTC 1/SC 29/WG 11, 4th Meeting: Chengdu, CN, JVET-D0097, XP030150336, pp. 1-4, International Telecommunication Union, Geneva, Switzerland (Oct. 15-21, 2016).

(Continued)

*Primary Examiner* — Rebecca A Volentine
(74) *Attorney, Agent, or Firm* — Leydig, Voit & Mayer, Ltd.

(57) ABSTRACT

The present disclosure relates to image coding/decoding applying deblocking filtering and decoder-based intra-mode determination. In order to efficiently use software and/or hardware resources, the size of the template for the decoder-based intra-mode determination is smaller than the number of lines used by the deblocking filtering.

20 Claims, 10 Drawing Sheets

(56) References Cited

U.S. PATENT DOCUMENTS

| | | | |
|---|---|---|---|
| 2019/0141318 A1* | 5/2019 | Li | H04N 19/147 |
| 2019/0166370 A1* | 5/2019 | Xiu | H04N 19/147 |
| 2019/0215512 A1* | 7/2019 | Lee | H04N 19/176 |
| 2019/0222837 A1* | 7/2019 | Lee | H04N 19/44 |

OTHER PUBLICATIONS

Tikekar et al., "A 249-Mpixel/s HEVC Video-Decoder Chip for 4K Ultra-HD Applications," IEEE Journal of Solid-State Circuits, vol. 49, No. 1, pp. 61-72, XP011534947, Institute of Electrical and Electronics Engineers, New York, New York (Jan. 2014).

Liu et al., "A Memory-Efficient Architecture for Intra Predictor and De-Blocking Filter in Video Coding System," 2012 IEEE Asia Pacific Conference on Circuits and Systems, XP032314961, pp. 555-558, Institute of Electrical and Electronics Engineers, New York, New York (Dec. 2012).

Chen et al., "Adaptive Loop Filter with Zero Pixel Line Buffers for LCU-based Decoding," Joint Collaborative Team on Video Coding (JCT-VC) of ITU-T SG16 WP3 and ISO/IEC JTC1/SC29/WG11, 6th Meeting: Torino, IT, JCTVC-F054, XP030009077, pp. 1-11, International Telecommunication Union, Geneva, Switzerland (Jul. 14-22, 2011).

Xiu et al., "EE8-related: Decoupling decoder-side intra mode derivation from entropy decoding," Joint Video Exploration Team (JVET) of ITU-T SG 16 WP 3 and ISO/IEC JTC 1/SC 29/WG 11, 4th Meeting: Chengdu, CN, JVET-D0098, pp. 1-4, International Telecommunication Union, Geneva, Switzerland (Oct. 15-21, 2016).

"Series H: Audiovisual and Multimedia Systems, Infrastructure of audiovisual services—Coding of moving video, Advanced video coding for generic audiovisual services," Recommendation of ITU-T H.264, ITU-T Telecommunication Standardization Sector of ITU, pp. 1-812, International Telecommunication Union, Geneva, Switzerland (Apr. 2017).

* cited by examiner

Random Access Main 10
(** Template_Size (N) == 2 for blocks with W, H <= 8, N== 3 for blocks with W, H > 8)
Anchor : (HEM1.0 + BIO)
Tested : (HEM1.0 + BIO) + DIMD line memory harmonized with DBF

| | Y | U | V | EncT | DecT |
|---|---|---|---|---|---|
| | | | Over | | |
| BuildingHall | -0.38% | -0.22% | 0.31% | 108% | 97% |
| CampfireParty | -1.90% | -1.57% | -1.83% | 113% | 98% |
| CatRobot | -0.12% | -0.02% | -0.23% | 107% | 96% |
| Crosswalk | -0.19% | -0.11% | -0.49% | 104% | 96% |
| DaylightRoad | -0.28% | 0.35% | 0.54% | 110% | 97% |
| FoodMarket | -0.14% | -0.30% | -0.16% | 101% | 97% |
| ParkRunning | -0.04% | -0.31% | 0.15% | 113% | 97% |
| Tango | -0.36% | -1.11% | -0.82% | 105% | 97% |
| RitualDance | -0.38% | -0.52% | -0.98% | 108% | 98% |
| Timelapse | -0.14% | -2.38% | -1.35% | 111% | 97% |
| Catctus | -0.33% | -0.13% | -0.11% | 106% | 95% |
| BasketballDrive | -0.32% | -0.16% | -0.23% | 112% | 98% |
| BQTerrace | -0.45% | 0.01% | 0.17% | 108% | 98% |
| Class 4K | -0.43% | -0.41% | -0.32% | 107% | 97% |
| Class HD | -0.33% | -0.64% | -0.50% | 109% | 97% |
| Overall(4K+HD) | -0.39% | -0.50% | -0.39% | 108% | 97% |

Fig. 8

Random Access Main 10

| | Anchor : HEM 1.1 + DIMD<br>Tested : Anchor + Modified template sizes | | | | |
|---|---|---|---|---|---|
| | Y | U | V | EncT | DecT (HW) |
| BuildingHall | 0.05% | 0.09% | -0.13% | 113% | 104% |
| CampfireParty | 0.04% | 0.01% | -0.03% | 114% | 104% |
| CatRobot | -0.05% | -0.44% | -0.04% | 115% | 99% |
| Crosswalk | -0.06% | 0.38% | -0.24% | 113% | 101% |
| DaylightRoad | 0.05% | -0.21% | 0.16% | 108% | 102% |
| FoodMarket | 0.09% | 0.11% | 0.32% | 115% | 99% |
| ParkRunning | 0.00% | 0.24% | -0.01% | 108% | 98% |
| Tango | -0.02% | 0.33% | -0.10% | 105% | 96% |
| RitualDance | -0.16% | 0.22% | -0.40% | 110% | 101% |
| Timelapse | -0.30% | 2.61% | 1.71% | 109% | 104% |
| Catctus | -0.10% | 0.32% | 0.19% | 114% | 95% |
| BasketballDrive | -0.06% | -0.60% | -0.29% | 123% | 87% |
| BQTerrace | -0.12% | 0.37% | 1.30% | 108% | 102% |
| Class 4K | 0.01% | 0.06% | -0.01% | 111% | 100% |
| Class HD | -0.15% | 0.58% | 0.50% | 112% | 98% |
| Overall(4K+HD) | -0.05% | 0.26% | 0.19% | 112% | 99% |

Random Access Main 10

| | Anchor : HEM 1.1<br>Tested : HEM 1.1 + *DIMD with Modified template sizes | | | | |
|---|---|---|---|---|---|
| | Y | U | V | EncT | DecT(HW) |
| BuildingHall | -0.34% | -0.14% | 0.18% | 122% | 101% |
| CampfireParty | -1.86% | -1.56% | -1.86% | 128% | 103% |
| CatRobot | -0.17% | -0.46% | -0.28% | 123% | 102% |
| Crosswalk | -0.25% | 0.27% | -0.73% | 117% | 98% |
| DaylightRoad | -0.23% | 0.14% | 0.70% | 118% | 103% |
| FoodMarket | -0.05% | -0.20% | 0.16% | 116% | 97% |
| ParkRunning | -0.04% | -0.07% | 0.14% | 121% | 97% |
| Tango | -0.38% | -0.79% | -0.92% | 111% | 95% |
| RitualDance | -0.54% | -0.29% | -1.38% | 118% | 98% |
| Timelapse | -0.45% | 0.22% | 0.32% | 121% | 99% |
| Catctus | -0.43% | 0.18% | 0.09% | 121% | 92% |
| BasketballDrive | -0.38% | -0.76% | -0.52% | 137% | 84% |
| BQTerrace | -0.57% | 0.38% | 1.46% | 117% | 111% |
| Class 4K | -0.41% | -0.35% | -0.32% | 119% | 99% |
| Class HD | -0.47% | -0.05% | -0.01% | 123% | 96% |
| Overall(4K+HD) | -0.44% | -0.24% | -0.20% | 121% | 98% |

Fig. 9

DECODER SIDE INTRA MODE DERIVATION TOOL LINE MEMORY HARMONIZATION WITH DEBLOCKING FILTER

CROSS-REFERENCE TO RELATED APPLICATIONS

This application is a continuation of International Application No. PCT/EP2017/066695, filed on Jul. 4, 2017, the disclosure of which is hereby incorporated by reference in its entirety.

TECHNICAL FIELD

The present disclosure relates to the field of computer vision, in particular to image and/or video processing and image and/or video coding.

BACKGROUND

Current block-based hybrid video codecs employ predictive coding. A picture of a video sequence is subdivided into blocks of pixels and these blocks are then coded. Instead of coding a block pixel by pixel, the entire block is predicted using already encoded pixels in the spatial or temporal proximity of the block. The encoder further processes only the differences between the block and its prediction. The further processing typically includes a transformation of the block pixels into coefficients in a transformation domain. The coefficients may then be further compressed (e.g., by means of quantization) and further compacted (e.g., by entropy coding) to form a bitstream. The bitstream can further include any signaling information which enables the decoder to decode the encoded video. For instance, the signaling may include settings concerning the encoder settings such as size of the input picture, frame rate, quantization step indication, prediction applied to the blocks of the pictures, or the like.

The differences between a block and its prediction are known as the residual of the block. More specifically, each pixel of the block has a residual, which is the difference between an intensity level of that pixel and its predicted intensity level. The intensity level of a pixel is referred to as the pixel value or value of the pixel. The residuals of all the pixels of a block are referred to collectively as the residual of the block. In other words, the block has a residual which is a set or matrix consisting of the residuals of all the pixels of the block. The term pixel denotes a sample of an image. This may be a sample in one color component (such as red, green, blue, white) or in luminance and/or one or more chrominance components or merely a brightness value of a gray-scale image.

Spatial prediction exploits spatial redundancy in natural or computer-generated images. It may be employed in still image or video image (moving picture) compression. Since the spatial prediction for predicting pixel values of a current block uses only pixels within the same image or video frame, it is often referred to as intra-prediction. This is in contrast to the inter-prediction which exploits temporal redundancy of the video images for prediction of pixel values of a current block pixels from other images.

Intra-prediction computes predictor of a current block based on already processed (reconstructed) blocks adjacent to the current block. Usually, pixels of the adjacent blocks which are located closest to the current block (typically pixels of the adjacent blocks adjacent to the current block, i.e. located at the boundary to the current block) are used as reference pixels to predict the current block.

In H.265/HEVC (High-Efficiency Video Coding) standard, The HEVC intra prediction methods can be classified in two categories, angular (directional) and planar. Angular prediction methods provide the codec with a possibility to accurately model structures with directional edges since they extrapolate the reference pixels in a certain direction in order to enable continuing of edges which cross the boundary between the reference pixels and the current block. Directions used in HEVC are illustrated in FIG. 3A.

The planar prediction methods include DC prediction and planar predictors estimating smooth image content. In the case of DC prediction, the predicted sample values are populated with a constant value representing the average of the reference samples immediately left and to the above of the block to be predicted. On the other hand, planar predictor has the capability to generate a prediction surface without discontinuities on the block boundaries. This is achieved by averaging a horizontal and vertical linear prediction on sample basis based on the distance of the predicted sample from the reference pixels.

As the reconstruction is performed at transform block granularity, also the intra prediction is operated at the selected transform block size ranging from 4×4 to 32×32 samples each of which supports 33 distinct prediction directions. A decoder must thus support 132 combinations of block size and prediction direction.

There are also different filtering alternatives for pre-processing the reference samples prior to applying those in the actual intra prediction process. Similarly, some of the prediction modes include a post-processing step to refine the sample surface continuity on the block boundaries.

Further details of the intra-prediction in HEVC can be found in V. Sze et al (Ed.), High Efficiency Video Coding (HEVC): Algorithms and Architectures, Springer, 2014, Chapter 4, incorporated herein by reference. In particular, Section 4.3.1.2 clarifies that reference pixels for a current block may be extended to include further pixels in the same line (row or column) as reference pixels of the adjacent block. This is illustrated in FIG. 3B (from Sze et al.), in which left reference samples are projected to extend the top reference row. The bold arrow represents the prediction direction, the thin arrows the reference sample projections in the case of intra mode 23.

The intra-prediction is more accurate if there are more angular directions, especially for larger block sizes. On the other hand, more directions requires also more signaling overhead for including the selected direction (intra-prediction mode) into the bitstream.

In order to provide a tradeoff between the accuracy and signaling overhead, decoder-side intra-mode derivation (DIMD) tool has been developed.

The DIMD tool derives the intra mode by matching a template with candidate predictors of different intra modes and selecting the intra mode with the best match. A template is an area of pixels in an already reconstructed adjacent block. The candidate predictors are generated from a reference line neighbor to the template area. Matching is performed by calculating a similarity metric such as the sum of absolute differences (SAD) between the template samples and the candidate predictor samples. The intra mode which results in the minimum SAD is chosen as the final derived intra mode.

Details on DIMD can be found in JVET-D0097, "*EE8: Decoder-side intra mode derivation*" by Xiaoyu Xiu et al., 4th meeting of ITU-T SG 16 WP 3 and ISO/IEC JTC 1/SC 29/WG 11 on 15-21 Oct. 2016, incorporated herein by reference. US 20120106640 A1 also shows decoding side intra prediction derivation for video coding.

SUMMARY

With usage of DIMD, the signaling amount may be reduced. On the other hand, the complexity of the decoder increases. In particular, the decoder now has to determine the intra-mode of the current block by performing template matching rather than merely obtaining the intra-mode from the bitstream. Moreover, with the template matching it is necessary to store the template pixels and the reference line in memory. Accordingly, a larger memory and/or more accesses to the memory may be required.

In typical implementations, a line memory (e.g., a line buffer) is used which may be located off-chip especially for large image sizes. The repeated access to such memory may require more power and time. The line memory is used especially in case when the current block boundary is at the same time a coding tree unit boundary. Since the coding tree boundary line or more lines are necessary for intra-prediction as well as for further processing of the blocks to be decoded, they have to be stored.

Therefore, according to the present disclosure, the line memory requirements for DIMD tool and the deblocking filter are harmonized. In particular, the size of the template and the number of lines used by the deblocking filter are selected in such a way that both may use the line buffer of the same size and utilize the lines stored therein.

For instance, the existing implementations of codecs such as HEVC use already certain number of lines for deblocking filtering. Selecting the size of the template in such a manner that no additional line in the line buffer is necessary for performing DIMD may then provide advantages in terms of buffer size savings and possibilities of common implementation of DIMD and the existing deblocking approaches in the known architectures.

In an aspect of the present disclosure, an apparatus for processing coding blocks of an image is provided. The apparatus comprises a deblocking filter unit configured to perform deblocking filtering of a current coding block using a first number M of adjacent lines of pixels of a reconstructed coding block being a neighbor of the current coding block. The apparatus further comprises an intra-prediction-mode determination unit configured to determine an intra-prediction mode to be used for the current coding block based on a second number N of the adjacent lines of pixels, and on a reference line of pixels in a reconstructed portion of the image, parallel and adjacent to the N adjacent lines. N is smaller than M, and the adjacent lines are parallel to a border between the current coding block and the reconstructed coding block and including a line adjacent to the current coding block.

Accordingly, both deblocking filtering and DIMD may utilize the same number of lines in the line buffer. Moreover, for the present HEVC implementations or further developments of HEVC, no line buffer extension is necessary, if DIMD is introduced as an additional tool.

In one example, N is smaller than M if the border between the current coding block and the reconstructed coding block concurs with a border between coding tree blocks.

For instance, the intra-prediction mode determination unit is configured to determine the intra-prediction mode based on a cost function that outputs, for each of a plurality of candidate intra-modes, a similarity between pixels of the reference line and each of the N adjacent lines.

For example, N is equal to or smaller than three.

In one implementation, N is equal to three if the current coding block has more than eight lines parallel to the N lines. This implementation is advantageous in particular in view of the current HEVC realizations.

For example, N is equal to one if the number of lines of the current coding block being parallel to the N lines is four.

As another example, N is equal to the logarithm to the basis 2 of a measure U of the size of the current coding block minus a parameter K, $$N = \log 2(U) - K.$$

Therein, U is the number of lines of pixels of the current coding block parallel to the border between the current coding block and the reconstructed coding block.

As a further example, N is equal to the logarithm to the basis 2 of a minimum or a maximum of a height H and a width W of the current coding block minus a parameter K $$N = \log 2(\min \text{ or } \max(H, W)) - K.$$

Alternatively, N is equal to the logarithm to the basis 2 of a product of a height H and a width W of the current coding block minus a parameter J, $$N = \log 2(H \times W) - J.$$

As a further example, N is equal to or larger than M if the border between the current coding block and the reconstructed coding block does not concur with a border between coding tree blocks.

Advantageously, the apparatus is embedded by a processor and configured to access an external line memory not embedded by the processor on which the adjacent lines are stored.

In an embodiment, an image encoding device comprises the apparatus for processing coding blocks of an image. The image encoding device further comprises an encoding unit configured to encode the image to generate a bitstream.

For example, the encoding unit is configured to encode the image to generate a bitstream including a sequence parameter set, SPS, a picture parameter set, PPS, and/or a slice header, and to include N in the SPS, PPS, or the slice header.

In another embodiment, an image decoding device comprises the apparatus for processing coding blocks of an image. The image decoding device further comprises a decoding unit configured to decode the image from a bitstream.

For example, the decoding unit is configured to decode the image from a bitstream including a sequence parameter set, SPS, a picture parameter set, PPS, and/or a slice header, and to obtain N from the SPS, PPS, or the slice header.

As a second aspect, a method for processing coding blocks of an image is described. The method comprises deblocking filtering of a current coding block using a first number M of adjacent lines of pixels of a reconstructed coding block being a neighbor of the current coding block. The method further comprises determining an intra-prediction mode to be used for the current coding block based on a second number N of the adjacent lines of pixels, and on a reference line of pixels in a reconstructed portion of the image, parallel and adjacent to the N adjacent lines. N is smaller than M, and the adjacent lines are parallel to a border between the current coding block and the reconstructed coding block and including a line adjacent to the current coding block.

Advantageously, N is smaller than M if the border between the current coding block and the reconstructed coding block concurs with a border between coding tree blocks.

For instance, the intra-prediction mode is determined based on a cost function that outputs, for each of a plurality of candidate intra-modes, a similarity between pixels of the reference line and each of the N adjacent lines.

For example, N is equal to or smaller than three.

Advantageously, N is equal to three if the current coding block has more than eight lines parallel to the N lines.

For example, N is equal to one if the number of lines of the current coding block being parallel to the N lines is four.

As another example, N is equal to the logarithm to the basis 2 of a measure U of the size of the current coding block minus a parameter K, $$N=\log 2(U)-K.$$

Therein, U is the number of lines of pixels of the current coding block parallel to the border between the current coding block and the reconstructed coding block.

As a further example, N is equal to the logarithm to the basis 2 of a minimum or a maximum of a height H and a width W of the current coding block minus a parameter K $$N=\log 2(\min \text{ or } \max(H,W))-K.$$

Alternatively, N is equal to the logarithm to the basis 2 of a product of a height H and a width W of the current coding block minus a parameter J, $$N=\log 2(H \times W)-J.$$

As a further example, N is equal to or larger than M if the border between the current coding block and the reconstructed coding block does not concur with a border between coding tree blocks.

The processing of the coding blocks may comprise accessing an external line memory not embedded by the processor on which the adjacent lines are stored.

In an embodiment, an image encoding method comprises the method steps for processing coding blocks of an image. The image encoding method further comprises encoding the image to generate a bitstream.

For example, in the encoding step, the bitstream includes a picture parameter set, PPS, and/or a slice header, and N is included in the SPS, PPS, or the slice header.

In another embodiment, an image decoding method comprises decoding an image from a bitstream. The image decoding method further comprises the method steps for processing coding blocks of an image.

For example, in the decoding step, the bitstream includes a picture parameter set, PPS, and/or a slice header, and N is obtained from the SPS, PPS, or the slice header.

Further disclosed is a computer readable medium storing program instructions. The program, when executed, performs the steps for processing coding blocks of an image.

BRIEF DESCRIPTION OF DRAWINGS

In the following exemplary embodiments are described in more detail with reference to the attached figures and drawings, in which:

FIG. 8 to FIG. 10*c* is a table of test results.

DETAILED DESCRIPTION OF EMBODIMENTS

The present disclosure relates to an efficient processing of coding blocks of an image and is particularly advantageous for harmonizing a line memory for DIMD with a deblocking filter (DBF). The processing of coding blocks may be employed in intra prediction during encoding and decoding of video. In the following, an exemplary encoder and decoder which may implement the processing of coding blocks of the present disclosure are described.

Figure 1:
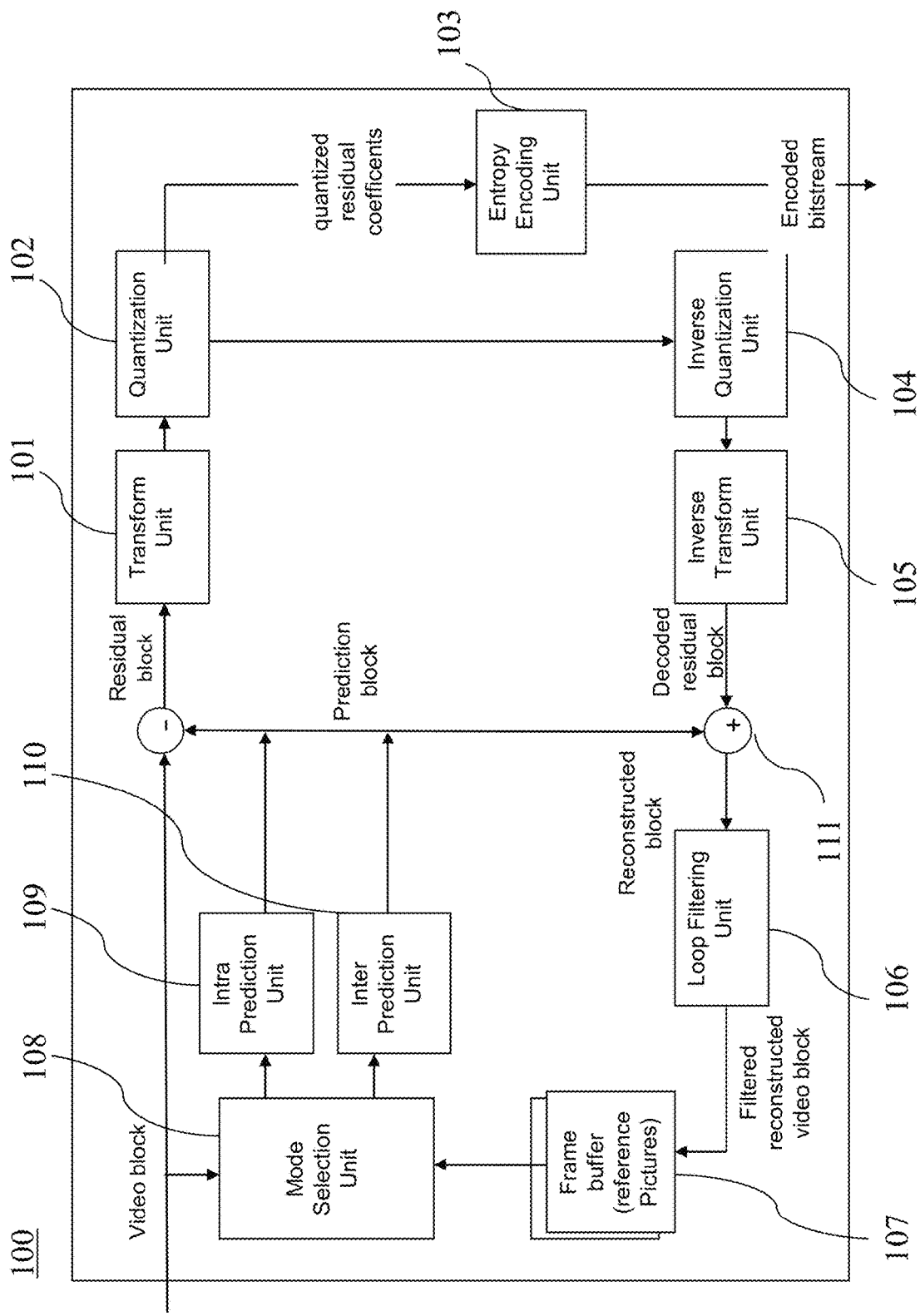
FIG. 1 is a block diagram showing an exemplary structure of a video encoder.

FIG. 1 shows an encoder 100 which comprises an input for receiving input blocks of frames or pictures of a video stream and an output for providing an encoded video bitstream. The term "frame" in this disclosure is used as a synonym for picture. However, it is noted that the present disclosure is also applicable to fields in case interlacing is applied. In general, a picture includes m times n pixels. These correspond to image samples and may each comprise one or more color components. For the sake of simplicity, the following description refers to pixels meaning samples of luminance. However, it is noted that the processing of coding blocks of the disclosure can be applied to any color component including chrominance or components of a color space such as RGB or the like. On the other hand, it may be beneficial to perform motion vector estimation for only one component and to apply the results of the processing to more (or all) components.

The input blocks to be coded do not necessarily have the same size. One picture may include blocks of different sizes and the block rasters of different pictures may also differ.

The encoder 100 is configured to apply prediction, transformation, quantization, and entropy coding to the video stream. The transformation, quantization, and entropy coding are carried out respectively by a transform unit 101, a quantization unit 102 and an entropy encoding unit 103 so as to generate as an output the encoded video bitstream.

The video stream may include a plurality of frames. Each frame is divided into blocks that are either intra or inter coded. The blocks of, for example, the first frame of the video stream are intra coded by means of an intra prediction unit 109. An intra frame is coded using information from that frame only, so that it can be decoded independently from other frames. An intra frame can thus provide an entry point in the bitstream, e.g., for random access. Blocks of other frames of the video stream may be inter coded by means of an inter prediction unit 110: each block of an inter-coded frame is predicted from a block in another frame (reference frame), e.g., a previously coded frame. A mode selection unit 108 is configured to select whether a block of a frame is to be intra predicted or inter predicted, i.e. whether it will be processed by the intra prediction unit 109 or the inter prediction unit 110. The mode selection unit 108 also controls the parameters of intra of inter prediction. In order to enable refreshing of the image information, an inter coded frame may comprise not only inter coded blocks, but also one or more intra coded blocks. Intra frames, in contrast, contain only intra coded and no inter coded blocks. Intra frames may be inserted in the video sequence (e.g., at regular intervals, that is, each time after a certain number of inter frames) in order to provide entry points for decoding (i.e., points where the decoder can start decoding without using information from preceding frames).

The intra prediction unit 109 is a block prediction unit. For performing spatial or temporal prediction, the coded blocks may be further processed by an inverse quantization unit 104 and an inverse transform unit 105. After reconstruction of the block by a reconstructor 110, a loop filtering unit 106 may be applied to further improve the quality of the decoded image. The reconstructor 110 adds the decoded residuals to the predictor to obtain a reconstructed block. The filtered blocks then form the reference frames that are then stored in a frame buffer 107. Such decoding loop (i.e., a decoder) at the encoder side provides the advantage of producing reference frames which are the same as the reference pictures reconstructed at the decoder side. Accordingly, the encoder and decoder side operate in a corresponding manner. The term "reconstruction" here refers to obtaining the reconstructed block by adding the decoded residual block to the prediction block.

The inter prediction unit 110 receives as an input a block of a current frame or picture to be inter coded and one or several reference frames or pictures from the frame buffer 107. Motion estimation and motion compensation are performed by the inter prediction unit 110. The motion estimation is used to obtain a motion vector and a reference frame, e.g., based on a cost function. The motion compensation then describes a current block of the current frame in terms of the translation of a reference block of the reference frame to the current frame, i.e. by a motion vector. The inter prediction unit 110 selects a prediction block (i.e. a predictor) for the current block from among a set of candidate blocks (i.e. candidate predictors) in the one or several reference frames such that the prediction block minimizes the cost function. In other words, a candidate block for which the cost function is minimum will be used as the prediction block for the current block.

For instance, the cost function may be a measure of a difference between the current block and the candidate block, i.e. a measure of the residual of the current block with respect to the candidate block. For example, the cost function may be a sum of absolute differences (SAD) between all pixels (samples) of the current block and all pixels of the candidate block in the candidate reference picture. However, in general, any similarity metric may be employed, such as mean square error (MSE) or structural similarity metric (SSIM).

However, the cost function may also be the number of bits that are necessary to code such inter-block and/or distortion resulting from such coding. Thus, a rate-distortion optimization procedure may be used to decide on the motion vector selection and/or in general on the encoding parameters such as whether to use inter or intra prediction for a block and with which settings.

The intra prediction unit 109 receives as an input a block of a current frame or picture to be intra coded and one or several reference samples from an already reconstructed area of the current frame. The intra prediction then describes pixels of a current block of the current frame in terms of a function of reference samples of the current frame. The intra prediction unit 109 outputs a prediction block for the current block, wherein said prediction block advantageously minimizes the difference between the current block to be coded and its prediction block; i.e., it minimizes the residual block. The minimization of the residual block can be based, e.g., on a rate-distortion optimization procedure. In particular, the prediction block is obtained as a directional interpolation of the reference samples. The direction may be determined by the rate-distortion optimization and/or by calculating a similarity measure as mentioned above in connection with inter-prediction.

The difference between the current block and its prediction, i.e. the residual block, is then transformed by the transform unit 101. The transform coefficients are quantized by the quantization unit 102 and entropy coded by the entropy encoding unit 103. The thus generated encoded video bitstream comprises intra coded blocks and inter coded blocks and the corresponding signaling (e.g., the mode indication, indication of the motion vector, and/or intra-prediction direction). The transform unit 101 may apply a linear transformation such as a discrete Fourier transformation (DFT) or a discrete cosine transformation (DCT). Such transformation into the spatial frequency domain provides the advantage that the resulting coefficients have typically higher values in the lower frequencies. Thus, after an effective coefficient scanning (such as zig-zag), and quantization, the resulting sequence of values has typically some larger values at the beginning and ends with a run of zeros. This enables further efficient coding. The quantization unit 102 performs a lossy compression by reducing the resolution of the coefficient values. Entropy coding unit 103 then assigns binary codewords to coefficient values. The codewords are written to a bitstream referred to as the encoded bitstream. The entropy coder also codes the signaling information (not shown in FIG. 1).

Figure 2:
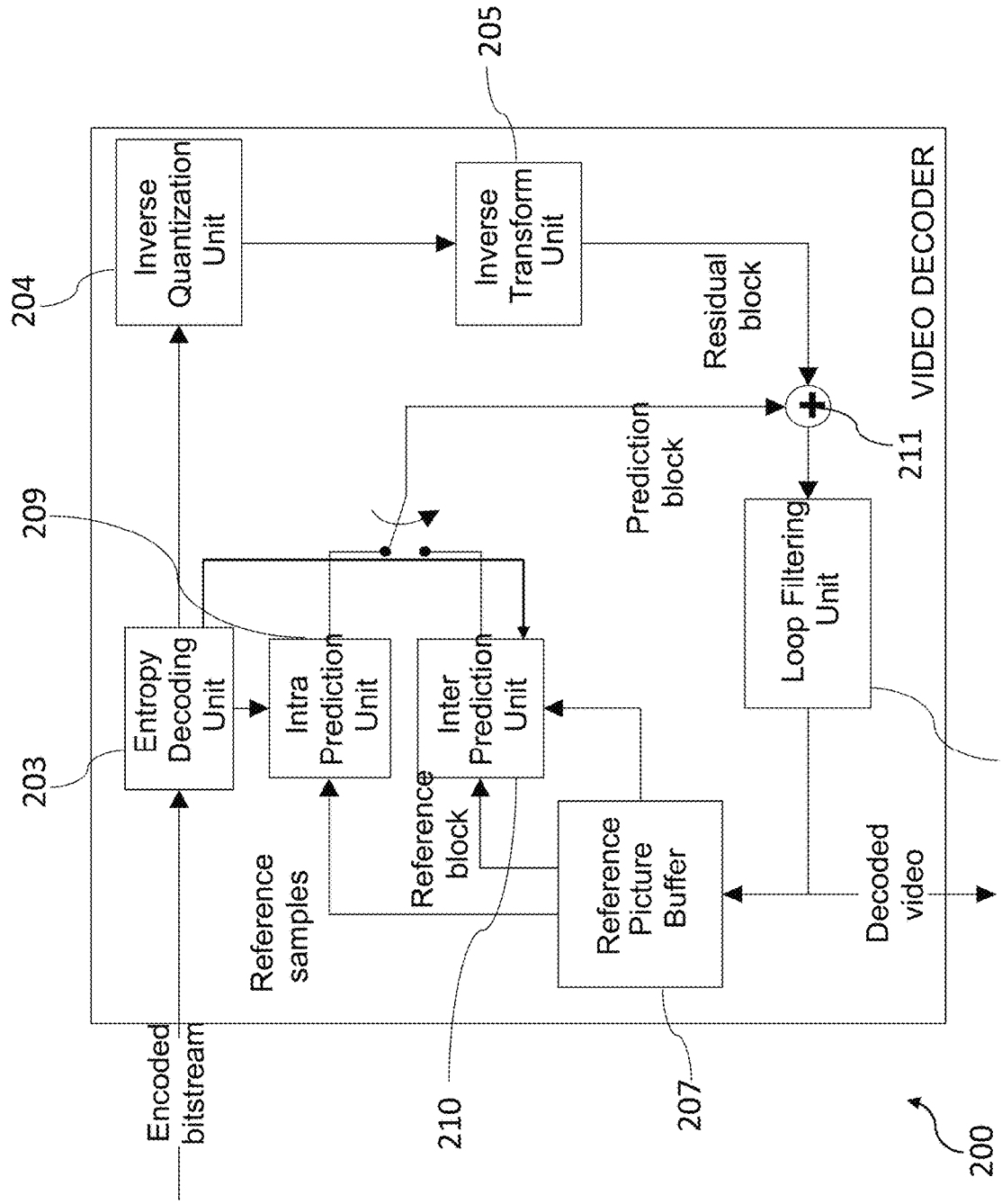
FIG. 2 is a block diagram showing an exemplary structure of a video decoder.

FIG. 2 shows an example of a video decoder 200. The video decoder 200 comprises particularly a reference picture buffer 207 and an intra prediction unit 209, which is a block prediction unit. The reference picture buffer 207 is configured to store at least one reference frame reconstructed from the encoded video bitstream of the encoded video bitstream. The intra prediction unit 209 is configured to generate a prediction block, which is an estimate of the block to be decoded. The intra prediction unit 209 is configured to generate this prediction based on reference samples that are obtained from the reference picture buffer 207.

The decoder 200 is configured to decode the encoded video bitstream generated by the video encoder 100, and preferably both the decoder 200 and the encoder 100 generate identical predictions for the respective block to be encoded/decoded. The features of the reference picture buffer 207 and the intra prediction unit 209 are similar to the features of the reference picture buffer 107 and the intra prediction unit 109 of FIG. 1.

The video decoder 200 comprises further units that are also present in the video encoder 100 like, e.g., an inverse quantization unit 204, an inverse transform unit 205, and a loop filtering unit 206, which respectively correspond to the inverse quantization unit 104, the inverse transform unit 105, and the loop filtering unit 106 of the video coder 100.

An entropy decoding unit 203 is configured to decode the received encoded video bitstream to obtain quantized residual transform coefficients and signaling information. The quantized residual transform coefficients are fed to the inverse quantization unit 204 and an inverse transform unit 205 to generate a residual block. The residual block is added to a prediction block in a reconstructor 211 and the resulting sum is fed to the loop filtering unit 206 to obtain a decoded video block. Frames of the decoded video can be stored in the reference picture buffer 207 and serve as reference frames for inter prediction.

Generally, the intra prediction units 109 and 209 of FIGS. 1 and 2 can use reference samples from an already encoded area to generate prediction signals for blocks that need to be encoded or need to be decoded.

The entropy decoding unit 203 receives as its input the encoded bitstream. The bitstream may first be parsed, i.e. the signaling parameters and the residuals are extracted from the bitstream. The syntax and semantic of the bitstream may be defined by a standard so that the encoders and decoders may work in an interoperable manner. As described in the above Background section, the encoded bitstream includes further information in addition to the prediction residuals.

As discussed above, blocks of a frame can be intra predicted by the intra-prediction unit 109 or 209 of a video encoder 100 or video decoder 200. The prediction is used for intra coding/decoding of the blocks. However, intra coding is not limited to encoding/decoding of video images and thus, the present disclosure may as well be applied in encoding/decoding of still images, since intra-prediction uses only already reconstructed samples of the same image.

When considering the current situation, deblocking filtering of HEVC uses 4 lines (rows, if the neighboring block is on the top, columns, it the neighboring block is on the left side) of the neighboring block and out of them filters three lines of the neighboring block as well as three lines of the current block. The default template sizes used in the above cited DIMD proposals are as follows: a template size of 2 (i.e. N=2) is used for blocks for which either width or height is not larger than 8 and a template size of 4 (i.e., N=4) is used for the other block sizes. For the coding units (CUs) whose top borders are aligned with horizontal CTU borders, a maximum of up to 5 lines are thus needed from the upper CTU row to derive the intra mode. Therefore for CTU based implementations, the reconstructed samples belonging to the 5 lines need to be stored in the line buffer/memory. This requires increasing the line buffer used for deblocking filtering.

Existing HEVC CTU based implementations already reserve a line buffer which needs to store four rows/lines of luma samples for deblocking filter dependenices between the CTU's in the vertical direction. Therefore the present disclosure enables harmonization the line memory requirements of DIMD tool with that of deblocking filter. In particular, the template sizes chosen for the DIMD should be less than or equal to three (i.e. N<=3).

An advantage of the using a template size less than or equal to 3 (i.e., N<=3) is that there is no additional line buffer (on top of DBF) required for successful intra mode derivation of DIMD. Furthermore, for larger blocks template size of three (i.e., N=3) is a good choice as reducing the size further (i.e., N<3) would lead to an sub-optimal intra mode derivation.

However, the farther the template samples are from the target block, the lesser may be the correlation between the target block samples and the samples from the template block. Therefore choosing a larger template block size might in some cases result in an sub-optimal intra mode derivation. In order to achieve the best possible BD-Rate gain, the template sizes should be adaptively chosen.

As described above, the encoder and decoder process blocks of an image. These blocks are referred to as coding units, CUs or coding blocks, CB. In general, CBs may have different sizes. In the existing codecs, such as H.265/HEVC, before coding, an image is subdivided into coding tree units (CTUs) (also referred to as coding tree blocks, CTBs), which have the same predefined size, for instance, 128×128 samples. Each CTB may be further partitioned into CBs which are then coded. The partitioning may be controlled by rate-distortion optimization. Typically, a quad-tree or a binary tree partitioning is applied, splitting a coding block respectively into four or into two equally sized coding blocks, starting from the CTB. The splitting information is then included into the bitstream in order to enable the decoder side to correctly parse the bitstream and, in particular, to recover the CBs coded in the bitstream. Each CTB may be divided into CUs individually. A CTB may also remain undivided. Details concerning partitioning may be found, for instance, in the book by V. Sze et al (Ed.), High Efficiency Video Coding (HEVC): Algorithms and Architectures, Springer, 2014, in particular in Chapter 3, incorporated herein by reference.

When applying intra-prediction, a current block is predicted on the basis of the samples of the neighboring (i.e. adjacent) block(s). Accordingly, samples of the already processed neighboring one or more blocks need to be stored in a memory. Apart from the intra-prediction, the samples of previously processed (reconstructed) blocks are also used for deblocking filtering.

Figure 3B:
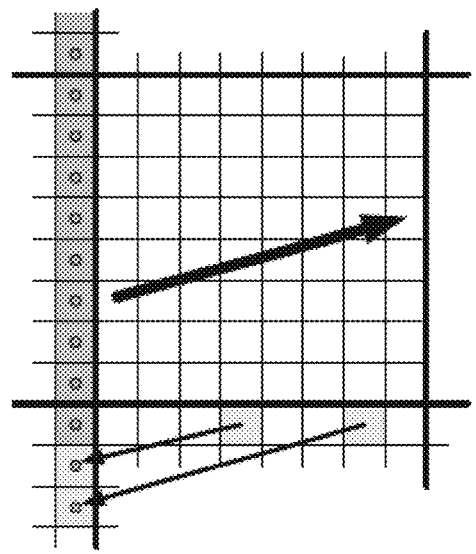
FIG. 3B is a schematic drawing illustrating example of reference pixel line extension for angular inter-prediction prediction modes.
Figure 3A:
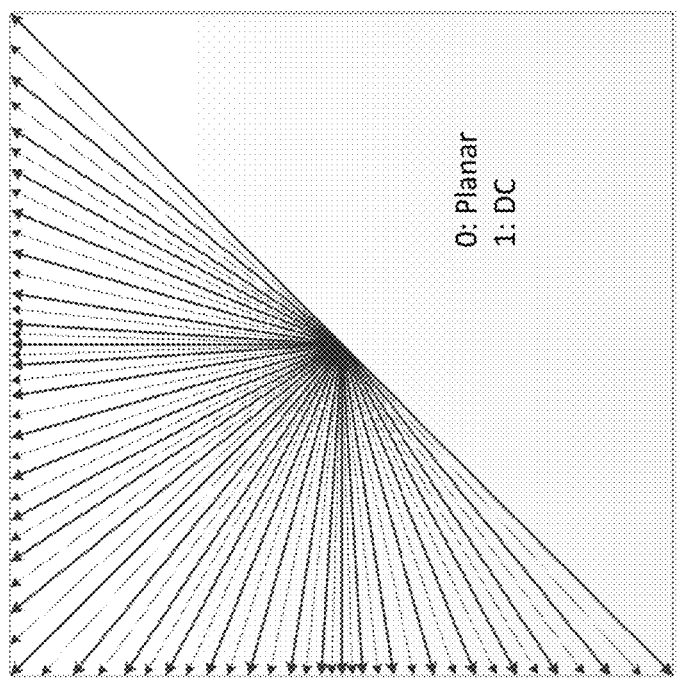
FIG. 3A is a schematic drawing illustrating the possible modes of decoder side intra mode derivation (DIMD).

Recently, the intra prediction has been extended to cover a large number of directions. For instance, FIG. 3A illustrates 65 directional modes corresponding to 65 prediction directions and, in addition, two further modes called DCT mode and planar mode (more details on DIMD can be found in JVET-D0097 incorporated herein by reference). Thus, when the encoder determines a directional mode, it includes the mode into the bitstream so that the decoder may parse it therefrom and apply to obtain the same predictor. With the extended number of modes, the signaling may require additional bits.

In order to avoid such additional signaling, a DIMD tool may be applied. Accordingly, the intra-mode is determined at the encoder side and at the decoder side based on the same information and in the same way, so that no signaling of the intra-mode is necessary. In particular, already reconstructed samples of neighboring blocks (such as left and top neighbors in the processing order from left to right and from top to bottom) are used as a template for estimating the intra-mode for the current block. The template is matched with corresponding portions obtained from a reference line for a plurality of respective candidate intra-modes. The reference line is a line among the reconstructed samples which is parallel to the current block boundary with the neighboring block. This line is extrapolated into different candidate intra-more directions. The best matching portion is then found and its intra-mode direction taken for the intra-mode of the current block. An advantage of DIMD is that intra-mode is determined implicitly, without including any control information into the bitstream. A disadvantage of the DIMD is that it required a larger memory for storing the reference line and the already reconstructed samples of the neighboring blocks forming the template in order to be able to perform the template matching.

CTB-based processing is commonly adopted in practical implementations. CTBs are encoded or decoded one by one in a raster scan order and the in-loop filtering is applied to the CTB boundaries right after the encoding/decoding of a CTB.

Figure 4:
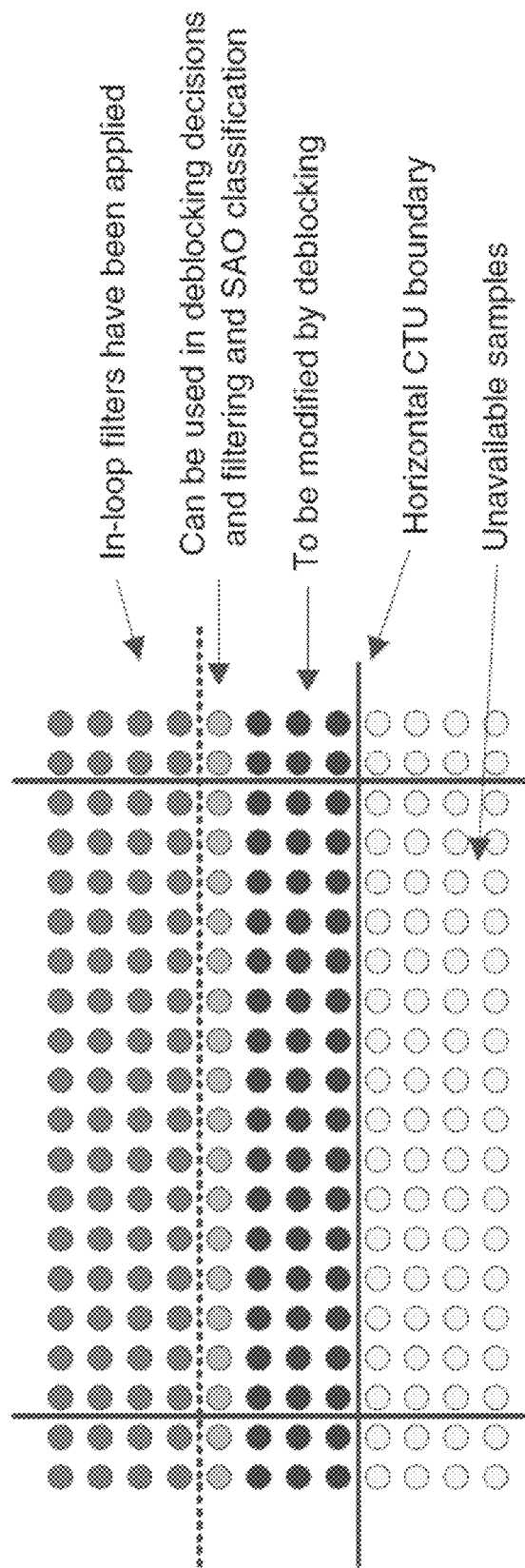
FIG. 4 is a schematic drawing illustrating deblocking filtering at a coding tree block (CTB) boundary.

FIG. 4 illustrates deblocking filtering of pixels at the horizontal boundary between a current coding block and its bottom neighbor.

The deblocking filter of the bottom horizontal CTB boundary needs samples from the CTB below. Hence, directly after the CTB above the horizontal boundary has been processed, the deblocking cannot be applied yet to the bottom rows of samples since the reconstructed samples of the CTB below the horizontal CTB boundary are not yet available.

In FIG. 4, samples, for instance luma samples, to be kept in a line memory (i.e. a line buffer) are delimited by a dashed horizontal line and a solid horizontal line. The solid horizontal line corresponds to a CTB boundary (referred to as "CTU (coding tree unit) boundary" in FIG. 4). In-loop filtering has already been applied to the samples above the dashed horizontal line. The in-loop filtering may include deblocking filtering, sample adaptive offset or any adaptive filtering. It is noted that the deblocking filtering does not only include the performing of the filtering operation itself, but also the decision whether or not the block will be filtered and which strength of the filter to choose, i.e. how many boundary lines are to be filtered. For instance, in HEVC, eight lines around the common boundary between a current block and a neighboring block are used by deblocking filtering: four lines in the current block and four lines in the neighboring block. All four lines are used to decide, whether and which filtering is to be used. Three lines in each of neighboring and current block are filtered, the respective fourth line is used for filtering, i.e. used to calculate filtered value of some pixels from the three lines. Deblocking filtering is a low-pass filtering.

The pixels of the row line of pixels below the dashed horizontal line can be used in deblocking decisions and sample adaptive offset (SAO) classification. The remaining three lines kept in the line buffer are to be modified by deblocking. Samples of the CTB below the horizontal CTB boundary are unavailable while the CTB above the boundary is still processed. Accordingly the samples between the dashed horizontal line and the horizontal CTB boundary should be kept in the line buffer until the samples of the CTB below the horizontal boundary have been reconstructed, i.e. are available.

When deblocking filtering is performed at a CTB boundary, the filter uses and possibly operates on the pixel lines on both sides of the boundary. Accordingly, in the example of FIG. 4, when the samples below the horizontal CTB boundary have become available, the first three lines below the horizontal boundary are possibly modified by deblocking, and the fourth line below the horizontal boundary can be used in deblocking decisions and SAO classification. More details on deblocking filtering can be found in the book by V. Sze et al (Ed.), High Efficiency Video Coding (HEVC): Algorithms and Architectures, Springer, 2014, in particular in section 7.2.2, incorporated herein by reference.

In FIG. 4, an example is shown where deblocking filtering is performed at a horizontal boundary between coding tree blocks. However, deblocking may be applied at a vertical CTB boundary as well. Moreover, deblocking filtering can be performed at coding block boundaries other than CTB boundaries as well, for in which case the line buffer for storing samples of a coding tree block previously reconstructed in processing order is not required.

In order to decrease memory bandwidth requirements, the information needed for in-loop filtering above a lower CTU boundary is kept in the fast on-chip memory until the CTU below has been reconstructed and the in-loop filters have been applied. This on-chip memory is usually called a "line-buffer" since the information for horizontal lines of samples typically needs to be kept.

In the deblocking filter, vertical filtering across a horizontal CTU boundary needs four rows of luma samples, two rows of Cb samples, and two rows of Cr samples from the upper CTU to be kept in the line buffer for the filtering decisions and operations (here it is assumed that the chrominance components are subsampled with respect to luminance component). Moreover, horizontal filtering across a vertical CTU boundary needs four columns of luma samples, two columns of Cb samples, and two columns of Cr samples from the upper CTU to be kept in the line buffer for the filtering decisions and operations.

Line buffers are thus required in this example to handle data dependencies between CTUs in the vertical and horizontal direction. For example, the deblocking filter needs to store four rows of luma pixels and two rows of chroma samples (per chroma component) due to the deblocking filter's support. However, the present disclosure is not limited to the number of lines of (luma) samples in each coding block being four; a larger number, for example five lines, or a smaller number (e.g. three lines) are also possible.

Thus, a line buffer for storing all lines required for filtering as described above is necessary. The length of the lines depends on the size of the image to be coded/decoded.

Traditionally the line buffers have been implemented using on-chip static random access memory (SRAM). However for very large picture sizes, it may be necessary to store them in denser off-chip dynamic random access memory (DRAM). This results in an area and power trade-off as communicating to the off-chip DRAM takes much more power.

Also, off-chip DRAM is used most commonly to store the decoded picture buffer. The variable latency to the off-chip DRAM must be considered in the system pipeline during the architecture design of the encoder/decoder.

Intra prediction predicts a (current) block of pixels based on neighboring pixels in the same picture. The neighboring pixels are taken from one row of pixels to the top and one column to the left if the processing order of the blocks is from left to right and from top to bottom. Therefore, the traditional intra prediction requires up-to one line to be stored in the line buffer whereas tools like DIMD may need up to 5 lines from the upper CTU row. Therefore, as discussed above, to harmonize the line buffer requirements with that of the DBF, the template height is suggested to made three to make sure that only a maximum of up to lines are required to be stored in the line buffer.

Figure 5:
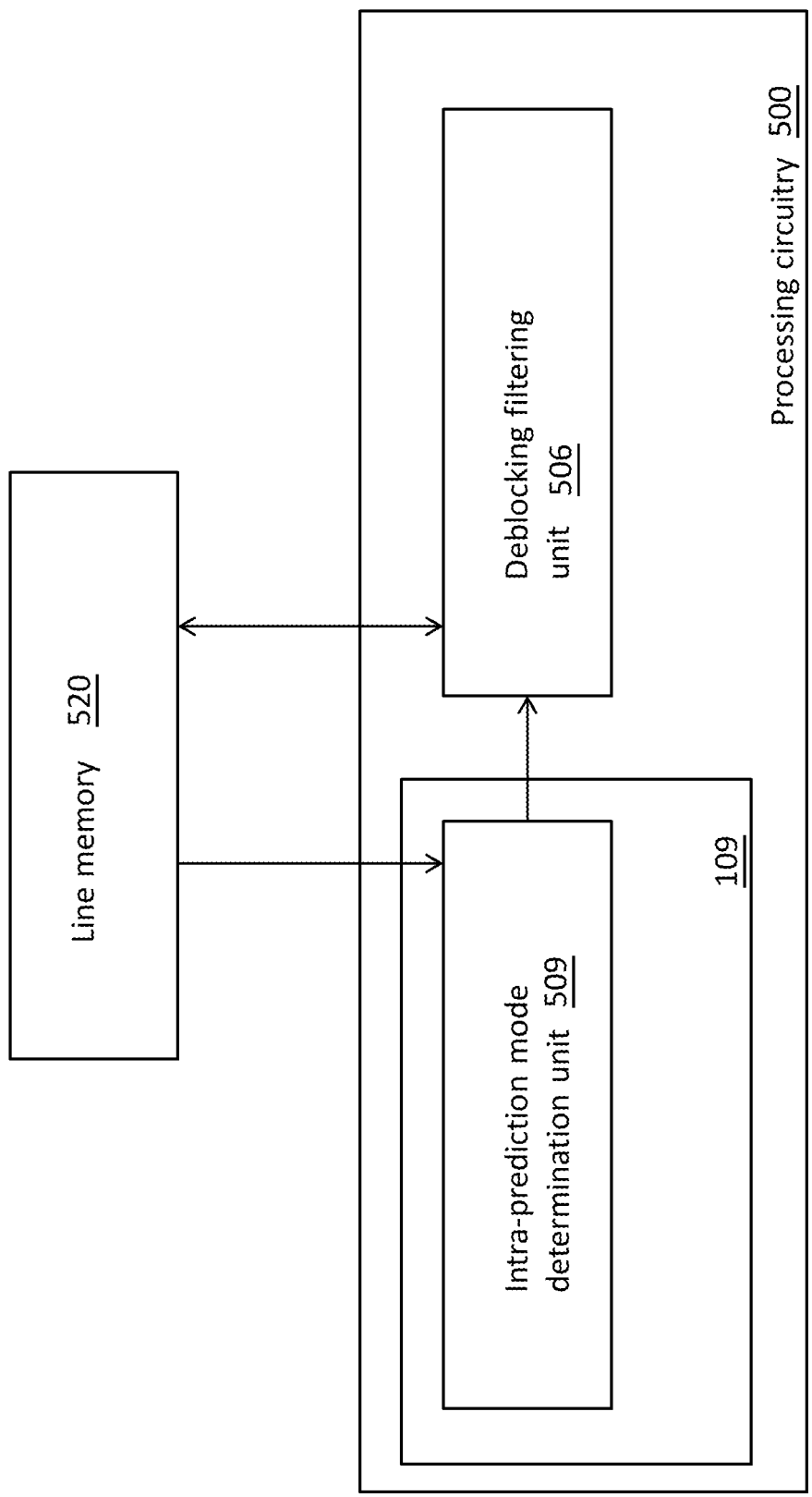
FIG. 5 is a block diagram of an apparatus for processing coding blocks of an image.

A block diagram of an apparatus for processing coding blocks of an image is shown in FIG. 5. The apparatus comprises a deblocking filter unit 506 corresponding to the loop filtering unit 106 or 206 and the intra-prediction mode determination unit 509 which may be part of the intra-prediction unit 109 or 209. For example, the intra-prediction mode determination unit 509 and the deblocking filtering unit 506 may be implemented in a processing circuitry 500. Then, the processing circuitry, in operation, performs intra-prediction mode determination and deblocking filtering. The processing circuitry may be part of a single processor or may be implemented as a combination of various hardware, programmable hardware and software.

Generally, the deblocking filter unit 106 can perform deblocking of a current coding block (CB) using a number M of adjacent lines of pixels of a reconstructed coding block. The reconstructed coding block is a neighbor of the current coding block and has been reconstructed previously in processing order.

Figure 6:
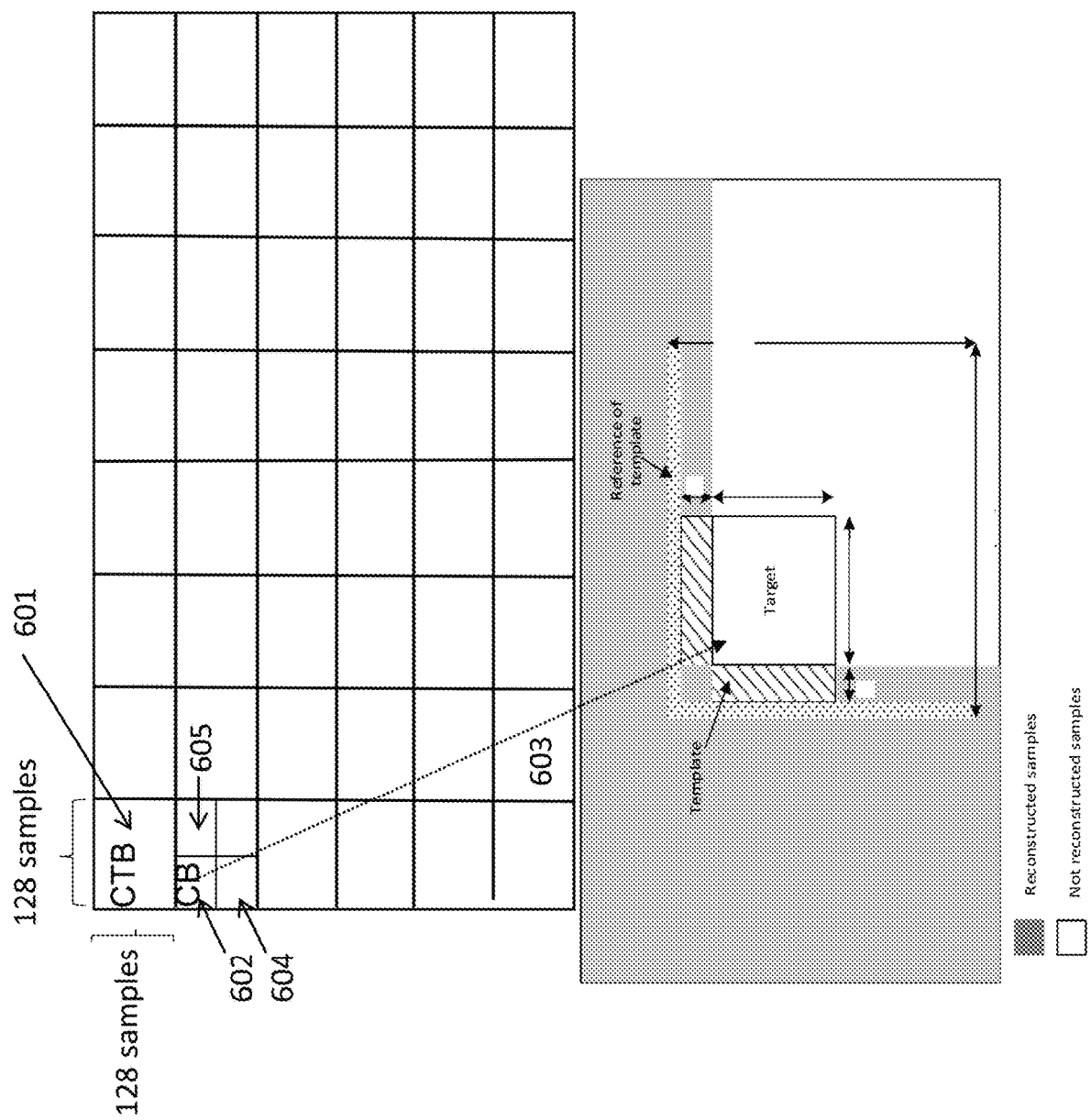
FIG. 6 is a schematic drawing illustrating an exemplary arrangement of coding blocks in an image.

In FIG. 6, an exemplary arrangement of the current coding block 602 and a reconstructed coding block 601, in is shown in the top part of the figure. Furthermore, the arrangement of the adjacent lines with respect to the coding tree block is shown in the bottom part of the Figure (an arrow 603 illustrates the correspondence of the current coding block in the top and bottom parts of the figure). The current coding block can be a coding tree block or a block resulting from partitioning the CTB, but it can also be a coding block obtained by partitioning a coding tree block, as shown in FIG. 6 (see the current coding block 602 ("CB") corresponding to a quarter of a coding tree block).

Figure 7:
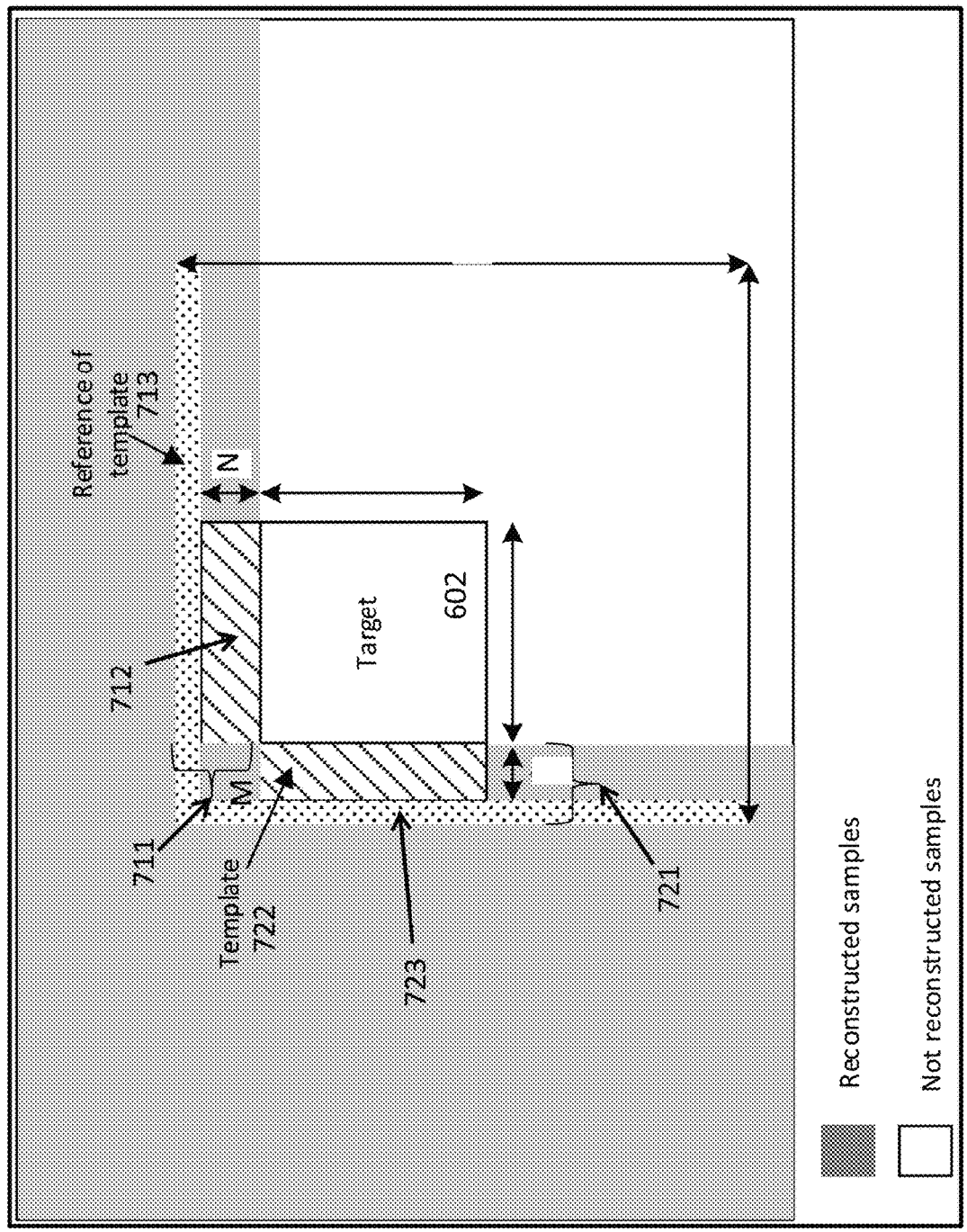
FIG. 7 is a schematic drawing illustrating the borders of a current coding block with a reconstructed portion of an image.

In FIG. 7, the bottom part of FIG. 6 is reprinted in a greater size. The M adjacent lines 711 and 721 correspond to the hatched regions plus the portions of the dotted regions above and respectively to the left of the hatched regions.

The intra-prediction mode determination unit 509 is configured to determine an intra-prediction mode to be used for the current coding block. This determination of the current coding block is based on N adjacent lines 712, 722 of the reconstructed coding block (indicated as hatched areas in FIG. 7).

The adjacent lines, i.e. the M lines 711, 721 as well as the N lines 712, 722 are parallel to a border (i.e. a boundary) between the current coding block 602 and the reconstructed coding block 601. Moreover, the adjacent lines include a line which is adjacent to the current coding block 602. The number N of adjacent lines 712, 722 is smaller than the number M of adjacent lines 711, 721 of the reconstructed coding block.

The determination of the current coding block is further based on a reference line 713, 723 of pixels in a reconstructed portion of the image. In particular, the reference line 713, 723 runs through the reconstructed coding block 601, but may exceed the boundaries of the reconstructed coding block 601 with one or two neighboring coding blocks different from the current coding block. The reference line 713, 723 is parallel and adjacent to the N adjacent lines 712, 722. In particular, the reference line 713, 723 is adjacent to the line among the N lines which is furthest from the border between the current coding block 602 and the reconstructed coding block 601.

The number N of adjacent lines 712, 722 used for intra-prediction mode determination corresponds to a "template size" of the template used in DIMD. Further, the reference line 713, 723 corresponds to a reference of the template.

Advantageously, the number N of adjacent lines 712, 722 is smaller than the number M of adjacent lines 711, 721 if the border between the current block and the reconstructed coding block concurs with a CTB border, i.e. a border between two neighboring coding tree blocks. In other words N is advantageously smaller than M if the current coding block 602 and the reconstructed coding block 601 are either comprised by different coding tree blocks, or at least one of the current coding block 602 and the reconstructed coding block 601 is a coding tree block. For instance, N may be smaller than M for each border between any two processing units of an image.

For example, the intra prediction mode may be determined based on a cost function. The cost function may output for each of a plurality of candidate intra modes such as shown in FIG. 3A, a similarity between pixels of the reference line 713, 723 and each of the N adjacent lines 712, 722. Accordingly, the SAD may be calculated respectively between the reference line 713, 723 and each of the N adjacent lines. The respective SADs for the N adjacent lines 712, 722 then are summed up, and their sum is chosen as the output of the cost function. To cover all of the DIMD candidate modes shown in FIG. 3A, the mode with the minimal cost may be chosen as a result of cost function calculations of a left template 722 of a reconstructed coding block adjacent to the left with a left reference line 723 in a left reconstructed image portion and a top template 712 of a reconstructed coding block adjacent to the top with a reference line 713 in a top reconstructed portion of the image.

It is noted that the similarity is calculated between the reconstructed area (template) formed by the second number of lines, N, each line with a length G (corresponding for instance to the CU size or smaller) and a predicted area predicted from the reference line. In particular, the predicted area includes the second number of lines—each of the lines corresponding to a portion of the reference line with the length G. The N lines of the predicted area are obtained by directional interpolation, in the same way as intra-prediction in the corresponding direction is performed. For instance, shifted parts of G pixels from the reference line are copied, the shift depending on the angular direction of the tested (matched) intra-mode.

Advantageously, N is equal to or smaller than three lines, independent of the size (i.e. the width and/or length) of the current coding block 602. Such a choice of N is advantageous especially if M=4 lines are used for deblocking filtering. For example, N may be equal to three if the current coding block has more than eight lines parallel or equal to the N lines 712 (which are therefore parallel to the border between the current coding block 602 and the reconstructed coding block 601). Therein, the number of lines of the current coding block 602 parallel to the N lines 712 corresponds to the height H of the current coding block if the reconstructed coding block 601 is adjacent at the top border (or at the bottom border) of the current coding block 602. On the other hand, the number of lines of the current coding block 602 parallel to the N lines 722 of the reconstructed coding block correspond to the width W of the current coding block 602 if the reconstructed coding block 601 is adjacent at the left border (or the right border) of the current coding block 602.

In the following, the number of pixels of the current coding block parallel to the border between the current coding block 602 and the reconstructed coding block 601, which corresponds to the width or the height of the current coding block, is also referred to as a measure U of the size of the current coding block.

Accordingly, as an example, N may be equal to three lines if U is larger than 8 lines. Otherwise, N may be equal to two if U is equal to or smaller than 8 lines. These values for the number N of adjacent lines 712, 722 which depend on the height or width of the current coding block 602 are advantageous because a good gain of the Bjontegard Delta Bit rate (BD-Rate) has been observed by the Inventors.

Furthermore, good results have been observed with N=1 if U=4 and, N=2 for U=8, and N=3 for U larger than 8. As another example N may be equal to three lines if U is larger than 8 lines, and a further distinction may be made for U being equal to or smaller than 8 lines. Accordingly, N may be equal to one if the number of lines of the current coding block being parallel to the N lines is four. In particular, N may be 2 if U is equal to 8 lines, and N may be one if U is equal to 4 lines. These values have also been found to be advantageous with respect to a good BD-Rate gain. In particular, such a choice of N takes into account the observation that the larger the template samples are from the current coding block, the lesser may be the correlation between the samples of the current block and the respective samples of the template.

Figure 10A:
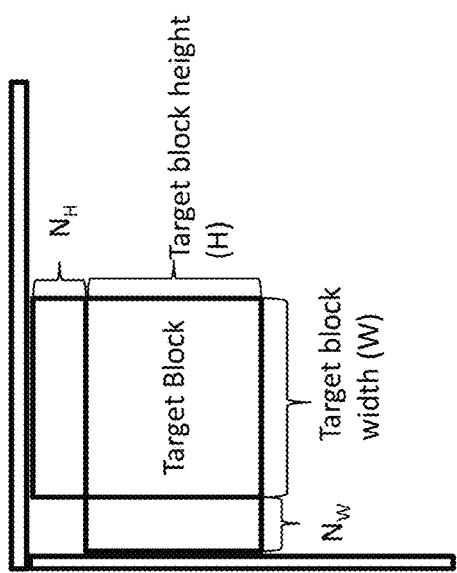
Figure 10B:
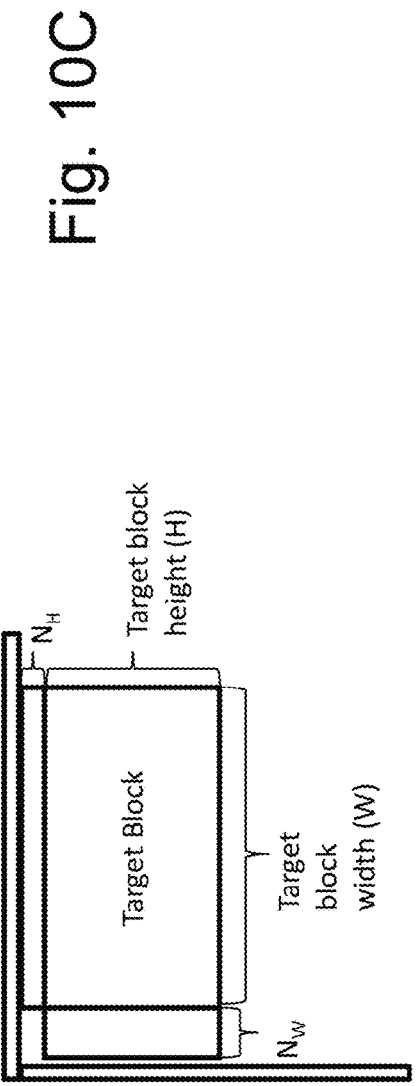
Figure 10C:
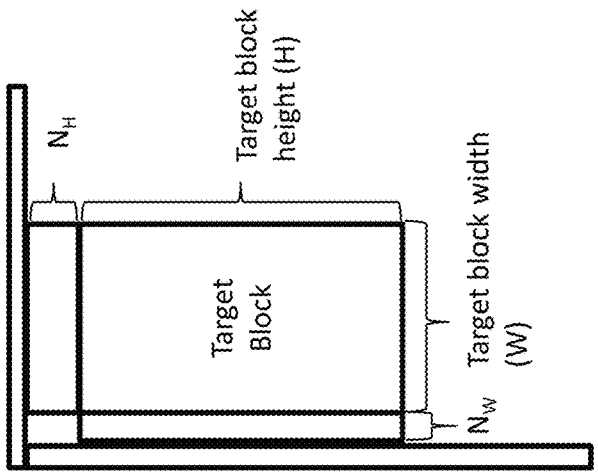

The height and the width of the current coding block 602 may be equal to each other, as shown in FIG. 10A, where the target block, i.e. the current coding block, is a square block. For square blocks N may be the same for the top template and the left template. In the following, the number of lines of the top template parallel to the horizontal lines of the current coding block is referred to as the "template height" $N_H$, and the number of lines of the left template parallel to the vertical lines of the current block is referred to as the "template width" $N_W$. Accordingly, for a square current coding block, the template height $N_H$ and the template width $N_W$ may be the same. However, the present disclosure is not limited to the height of the current coding block being equal to the width of the current coding block. For rectangular blocks having a greater width W than height H, as shown in FIG. 10B, $N_W$ may be greater than $N_H$. On the other hand, for rectangular blocks having a greater height H than width W, as shown in FIG. 10C, $N_H$ may be greater than $N_W$.

In particular, if the exemplary template sizes N are applied to the top template and the left template, the following two examples of template sizes $N_H$, $N_W$ depending on the width and height may be used. These exemplary template sizes are applicable to both square and (non-square) rectangular current coding blocks. Firstly, in an example, $N_W$=2 for W<=8; $N_W$=3 for W>8; and
$N_H$=2 for H<=8; $N_H$=3 for H>8.

Secondly, in an alternative example, the template sizes may modified be as follows (referred to hereafter also as "modified template sizes"):

$N_W$=1 for W=4, $N_W$=2 for W=8; $N_W$=3 for W>8; and
$N_H$=1 for H=4, $N_H$=2 for H<=8; $N_H$=3 for H>8.

For instance, as an alternative determining N to be equal to 3, 2, or 1, as disclosed above, the number N of the adjacent lines 712, 722 may also be determined to be equal to the logarithm to the basis 2 of the measure U (i.e. the width or the height) minus a parameter K. Accordingly, the K. Accordingly, N may be derived as $$N=\log 2(U)-K. \quad (1)$$

The parameter K can be determined based on properties of the current coding block 602, such as the measure U. For example, K can be equal to one if U is equal to 8 or 16 lines and equal to two if U is equal to 32 lines.

Mathematical expression (1) can be applied to a current coding block 602 with two adjacent reconstructed coding blocks if the height and the width of the current coding block 602 are different. Then, by using mathematical expression (1) and deriving the number N of adjacent lines is 712, 722 is derived respectively for each of two borders (e.g. with a top and a left reconstructed coding block), the number N of adjacent lines can be allowed to be different with respect to two borders of the current coding block 602 with adjacent reconstructed coding blocks.

Alternatively, it may be desired that the number N of adjacent lines 712, 722 is the same for both borders with neighboring reconstructed coding blocks. Then, the instead of using the height H at the border with the top (or bottom) reconstructed adjacent coding block and the width W at the border with the left reconstructed coding block, the minimum or maximum of height and width may be used. Accordingly, mathematical expression (1) is modified to $$N=\log 2(\min(W,H))-K, \quad (2)$$

or $$N=\log 2(\max(W,H))-K \quad (3).$$

Rather than the minimum function or the maximum function of mathematical expressions (2) and (3), a product of width W and height H can also be used to calculate the number of N adjacent lines 712, 722. Accordingly N is derived as $$N=\log 2(H \times W)-J, \quad (4)$$

wherein J is a parameter which may be determined, for example, in accordance with the width W or the height H of the current coding block (e.g., J=4 for W=16 and H=8).

N does not necessarily need to be smaller than M for each border of all coding blocks which are processed by the intra-prediction mode determination unit 509 and the deblocking filtering unit 506. For instance, N may be smaller than M only for those borders between a current coding block 602 and an adjacent reconstructed coding block 601 which concur with a CTB border. On the other hand, N may be equal to or larger than M if the border between the current coding block and the reconstructed coding block does not concur with a CTB border, i.e. if the current coding block and the reconstructed coding block are comprised by the same CTB (e.g., the border between a coding block 604 and its previously reconstructed top neighboring coding block 602 within the same coding tree block, or the border between a coding block 604 and its previously reconstructed left neighboring coding block within the same CTB). This approach provides the advantage of applying a more accurate DMID based on a larger template on the CU borders which are not CTU borders. Such larger templates do not necessarily require larger line buffer because only the reconstructed pixels from the inner boundaries within the CTU need to be stored, which may be done in smaller buffer(s) still in the on-chip memory (e.g. SRAM).

The reconstructed coding block 601 corresponds to a coding block that is reconstructed prior to the current coding block 602, i.e. it is previously processed in the processing order. Accordingly, if the coding order proceeds from the left of the image to the right and from top to bottom the reconstructed coding unit 601 corresponds either to the top neighbor or the left neighbor of the current coding block. However, the present disclosure is not limited to this typical processing order. The present disclosure is also applicable if the order of processing goes from the bottom to the top of the image and/or from the left to the right.

Moreover, a current coding block 602 which is not an edge of the image (the left or top edge in the described processing order from left to right and from top to bottom) from where the processing order is directed towards its opposite edge has two neighboring previously reconstructed coding blocks (for instance a left neighbor and a top neighbor). If the coding blocks has two such previously reconstructed neighboring blocks, the deblocking filtering and the intra-mode determination according to the present disclosure may be performed respectively using the adjacent lines and reference lines of both neighbors, for instance the adjacent lines 711, 712 and reference line 713 of the top neighbor as well as the adjacent lines 721, 722 and the reference line 723 of the left neighbor.

As shown in FIG. 5, the intra-prediction mode determining unit 509 as well as the deblocking filter unit 506 may be embedded by processing circuitry 500. The processing circuitry 500 may access an external line memory 520 which is not embedded by the processor. For example, the line memory may correspond to a line buffer stored in off-chip DRAM, as described above. In particular, the adjacent M and N adjacent lines 711, 712, 721, 722 of the reconstructed coding block 601 and the reference line 713, 723 of the reconstructed image portion may be stored in the external memory 520 if the border between the current coding block 602 and the reconstructed coding block concurs with a CTB border, i.e. if the adjacent lines 711, 712, 721, 722 and the reference line 713, 723 are comprised by coding tree block (s) different from the coding tree block comprising or being the current coding block.

The processing of coding blocks of an image may be performed by a circuitry of a video encoder 100 or decoder 200. In operation, the encoding unit 103 of the encoder 100 further encodes the image to generate a bitstream, and the decoding unit 203 of the decoder 200 decodes the image from the bitstream.

For example, the bitstream may include a sequence parameter set (SPS), a picture parameter set (PPS), and/or a slice header. The encoder 100 may include the number N of adjacent coding blocks 712, 722 in the SPS, the PPS, or the slice header. The decoder may obtain N from the SPS, the PPS, or the slice header. Accordingly, N need not be hard coded. Rather, the size N of the DIMD template 712, 722 can be derived at the encoder 100 signaled in the bitstream in the SPS, the PPS, or the slice header.

For example, the same size N of the template 712, 722 may be used for all coding blocks irrespective of their width, height or area. Alternatively, a default template size N' may be signaled (e.g., N'=3). For current coding blocks whose measure U of the size is greater than a given threshold (e.g., 8 lines) N' may be used as a value for N. For the other blocks whose size U is equal to or smaller than the threshold, N'−1 may be used as a value for N. As a further alternative, another default template size N" may be signaled (e.g., N"=2). For the coding blocks whose size U is equal to or smaller than the threshold, the default value N" may be used as the template size N, and for the other coding blocks having a size U greater than the threshold, N may be determined to be equal to N"+1.

Test results for a for line memory harmonization for deblocking filtering and intra-mode derivation are shown in FIG. 8 (e.g., N=2 for CBs with U<=8, N=3 for blocks with U>8). While no additional line memory is required for DIMD, no coding loss is observed compared to the original DIMD proposal which was using up to 5 lines of line memory for DIMD. The results of FIG. 8 show an overall (4K+HD) DIMD Luma BD-Rate gain of −0.39%. Currently, in experiments the best possible BD-Rate gain has been achieved for the following "modified" template sizes (see test results for modified template sizes in FIG. 9): Template width and template height=1 when current block width=4 and current block height=4 respectively; template width or template height=2 when current block width=8 and current block height=8 respectively; template width or Template height=3 for larger current coding block sizes. When compared to the previous DIMD results on top of the settings for the results of FIG. 8), tests with the modified template sizes show an additional BD-Rate gain of 0.15% on HD sequences, and no BD-Rate loss for 4K-sequences. A total DIMD BD-Rate gain increase by approximately 0.1% was observed. Moreover, a slightly reduced complexity at both encoder and decoder (in particular, a decoding time reduction by 1%) could be achieved. Moreover, the test results of FIG. 9 show a final, overall luma BD-Rate gain of −0.44%, and chroma BD-Rate gains of −0.24% for the U component and −0.20% for the V component. Furthermore, no abrupt chroma loss was observed on the TimeLapse Sequence. Furthermore, in the test of FIG. 9, a decoding time reduction of 1% was observed (in comparison with FIG. 8). One of the reasons is that by using a template, the number of SAD calculations was reduced. Moreover, an additional BD-Rate gain of 0.15% on HD sequences was observed.

The present disclosure is not limited to the examples shown above. For instance, the figures and the description exemplified using as a template the pixels of the left and the top template. This is because it was assumed that the decoding order goes from left to right and from top to bottom so that only the samples of the top and the left neighbors are available (reconstructed). However, the disclosure is also applicable to any other decoding order and the corresponding available neighboring blocks. The terms "neighboring" and "adjacent" are used in the sense of directly/immediately adjacent.

The present disclosure may be implemented in an apparatus. Such apparatus may be a combination of a software and hardware. For example, the intra-prediction and deblocking filtering may be performed by a chip such as a general purpose processor, or a digital signal processor (DSP), or a field programmable gate array (FPGA), or the like. However, the present disclosure is not limited to implementation on a programmable hardware. It may be implemented on an application-specific integrated circuit (ASIC) or by a combination of the above mentioned hardware components.

The intra-prediction and deblocking filtering determination may also be implemented by program instructions stored on a computer readable medium which when executed by a computed perform the steps of a method as described above. The computer readable medium can be any medium on which the program is stored such as a DVD, CD, USB (flash) drive, hard disc, server storage available via a network, etc.

The encoder and/or decoder may be implemented in various devices including a TV set, set top box, PC, tablet, smartphone, or the like. It may be a software, app implementing the method steps.

Summarizing, the present disclosure relates to image coding/decoding applying deblocking filtering and decoder-based intra-mode derivation. In order to efficiently use software and/or hardware resources, the size of the template for the decoder-based intra-mode derivation is smaller than the number of lines used by the deblocking filtering.

What is claimed is:

1. An apparatus for processing coding blocks of an image comprising a processing circuitry configured to:
   perform deblocking filtering of a current coding block using a first number M of adjacent lines of pixels of a reconstructed coding block being a neighbor of the current coding block, and
   determine an intra-prediction mode to be used for the current coding block based on:
      a second number N of the adjacent lines of pixels, and
      a reference line of pixels in a reconstructed portion of the image, wherein the reference line of pixels is parallel and adjacent to the N adjacent lines, the adjacent lines of pixels are parallel to a border between the current coding block and the reconstructed coding block, and the adjacent lines of pixels include at least a line of pixels adjacent to the current coding block;
   wherein N is smaller than M when the border between the current coding block and the reconstructed coding block concurs with a border between coding tree blocks; or wherein N is equal to or larger than M when the border between the current coding block and the reconstructed coding block does not concur with a border between coding tree blocks.

2. The apparatus according to claim 1, further configured to determine the intra-prediction mode based on a cost function that outputs, for each of a plurality of candidate intra-modes, a similarity between pixels of the reference line and each of the N adjacent lines.

3. The apparatus according to claim 1, wherein N is equal to or smaller than three.

4. The apparatus according to claim 1, wherein N is equal to three if the current coding block has more than eight lines parallel to the N lines.

5. The apparatus according to claim 1, wherein N is equal to one if the number of lines of the current coding block being parallel to the N lines is four.

6. The apparatus according to claim 1, wherein N is equal to the logarithm to the basis 2 of a measure U of the size of the current coding block minus a parameter K, $$N=\log 2(U)-K,$$

U being the number of lines of pixels of the current coding block parallel to the border between the current coding block and the reconstructed coding block.

7. The apparatus according to claim 1, wherein N is equal to the logarithm to the basis 2 of a minimum or a maximum of a height H and a width W of the current coding block minus a parameter K, $$N=\log 2(\min \text{ or } \max(H,W))-K.$$

8. The apparatus according to claim 1, wherein N is equal to the logarithm to the basis 2 of a product of a height H and a width W of the current coding block minus a parameter J, $$N=\log 2(H \times W)-J.$$

9. The apparatus according to claim 1, the apparatus being embedded by a processor and configured to access an external line memory not embedded by the processor on which the adjacent lines are stored.

10. An image encoding device comprising:
the apparatus for processing coding blocks of an image according to claim 1, and
an encoding unit configured to encode the image to generate a bitstream.

11. A video image encoding device comprising:
the apparatus for processing coding blocks of an image according to claim 1, and
an encoding unit configured to encode the image to generate a bitstream including at least one of a sequence parameter set (SPS), a picture parameter set (PPS), or a slice header, and to include N in the at least one of the SPS, PPS, or the slice header.

12. An image decoding device comprising:
the apparatus for processing coding blocks of an image according to claim 1, and
a decoding unit configured to decode the image from a bitstream.

13. A video image decoding device comprising
the apparatus for processing coding blocks of an image according to claim 1, and
a decoding unit configured to decode the image from a bitstream including at least one of a sequence parameter set (SPS), a picture parameter set (PPS), or a slice header, and to obtain N from the at least one of the SPS, the PPS, or the slice header.

14. A method for processing coding blocks of an image comprising the steps of:
deblocking filtering of a current coding block using a first number M of adjacent lines of pixels of a reconstructed coding block being a neighbor of the current coding block, and
determining an intra-prediction mode to be used for the current coding block based on:
a second number N of the adjacent lines of pixels, and
a reference line of pixels in a reconstructed portion of the image, wherein the reference line of pixels is parallel and adjacent to the N adjacent lines, the adjacent lines of pixels are parallel to a border between the current coding block and the reconstructed coding block, and the adjacent lines of pixels include at least a line of pixels adjacent to the current coding block;
wherein N is smaller than M when the border between the current coding block and the reconstructed coding block concurs with a border between coding tree blocks; or wherein N is equal to or larger than M when the border between the current coding block and the reconstructed coding block does not concur with a border between coding tree blocks.

15. An image encoding method comprising:
the steps for processing coding blocks of an image according to claim 14, and
encoding the image to generate a bitstream.

16. An image decoding method comprising:
decoding an image from a bitstream, and
the steps for processing coding blocks of the image according to claim 14.

17. The method according to claim 14, wherein N is equal to or smaller than three.

18. The method according to claim 14, wherein N is equal to three when the current coding block has more than eight lines parallel to the N lines.

19. The method according to claim 14, wherein N is equal to one if the number of lines of the current coding block being parallel to the N lines is four.

20. The method according to claim 14, wherein N is equal to the logarithm to the basis 2 of a measure U of the size of the current coding block minus a parameter K, $$N=\log 2(U)-K,$$

U being the number of lines of pixels of the current coding block parallel to the border between the current coding block and the reconstructed coding block.

* * * * *